(12) United States Patent
Kamata et al.

(10) Patent No.: US 7,782,562 B2
(45) Date of Patent: Aug. 24, 2010

(54) MAGNETIC RECORDING MEDIA AND MAGNETIC RECORDING DEVICE

(75) Inventors: Yoshiyuki Kamata, Tokyo (JP); Akira Kikitsu, Yokohama (JP); Masatoshi Sakurai, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1001 days.

(21) Appl. No.: 11/527,458

(22) Filed: Sep. 27, 2006

(65) Prior Publication Data
US 2007/0070547 A1    Mar. 29, 2007

(30) Foreign Application Priority Data
Sep. 27, 2005    (JP) .............................. 2005-279401

(51) Int. Cl.
*G11B 15/18* (2006.01)
(52) U.S. Cl. ....................................................... 360/71
(58) Field of Classification Search .................. 360/71, 360/72.1, 72.2, 72.3
See application file for complete search history.

(56) References Cited

U.S. PATENT DOCUMENTS

| | | | |
|---|---|---|---|
| 6,388,865 B1 * | 5/2002 | Honda et al. ................. | 361/311 |
| 6,542,339 B1 * | 4/2003 | Sasaki et al. ................. | 360/317 |
| 6,577,493 B2 * | 6/2003 | Honda et al. ................. | 361/311 |
| 6,611,420 B2 * | 8/2003 | Honda et al. ................. | 361/311 |
| 6,704,190 B2 * | 3/2004 | Honda et al. ................. | 361/311 |
| 2004/0091748 A1 | 5/2004 | Kamata et al. | |
| 2005/0282379 A1 * | 12/2005 | Saito et al. ................... | 438/624 |

FOREIGN PATENT DOCUMENTS

| | | |
|---|---|---|
| CN | 1558399 | 12/2004 |
| CN | 1637870 | 7/2005 |
| JP | 58-118028 | 7/1983 |
| JP | 06-036263 | 2/1994 |
| JP | 08-115519 | 5/1996 |
| JP | 2000-306227 | 11/2000 |
| JP | 3271406 | 1/2002 |
| JP | 2005-011459 | 1/2005 |

OTHER PUBLICATIONS

Austrian Search Report dated Nov. 19, 2007 for Appln. No. 200606056-0.
Chinese Office Action dated Jun. 6, 2008 for Appl. No. 2006101393893.

* cited by examiner

*Primary Examiner*—Joseph H Feild
*Assistant Examiner*—Huy D Nguyen
(74) *Attorney, Agent, or Firm*—Pillsbury Winthrop Shaw Pittman, LLP

(57) ABSTRACT

According to one embodiment, a magnetic recording media includes a magnetic recording layer formed on a substrate, in which recording tracks and servo areas are prescribed as patterns of protrusions and recesses formed on the magnetic recording layer so that thin film portions of the magnetic recording layer are formed under the recesses, a thickness of magnetic recording layer at the thin film portion is smaller than a thickness of magnetic recording layer at the protrusion in the servo area, and a magnetization direction of the protrusion is antiparallel to a magnetization direction of the thin film in the servo area.

9 Claims, 7 Drawing Sheets

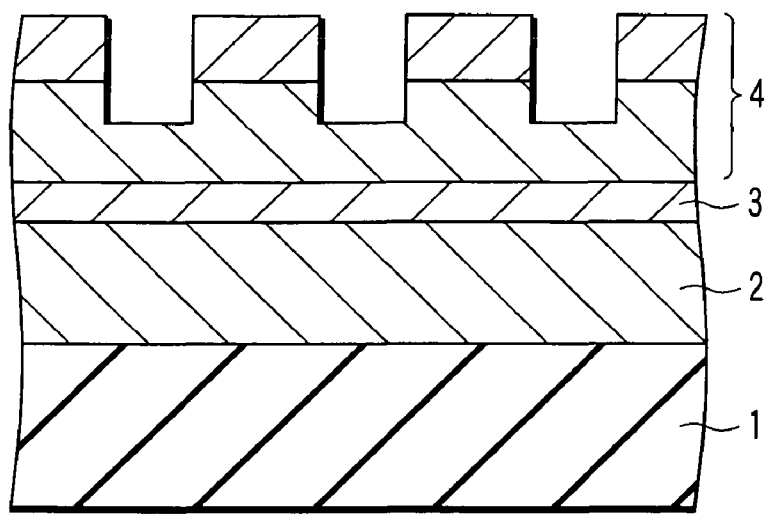
F I G. 7B
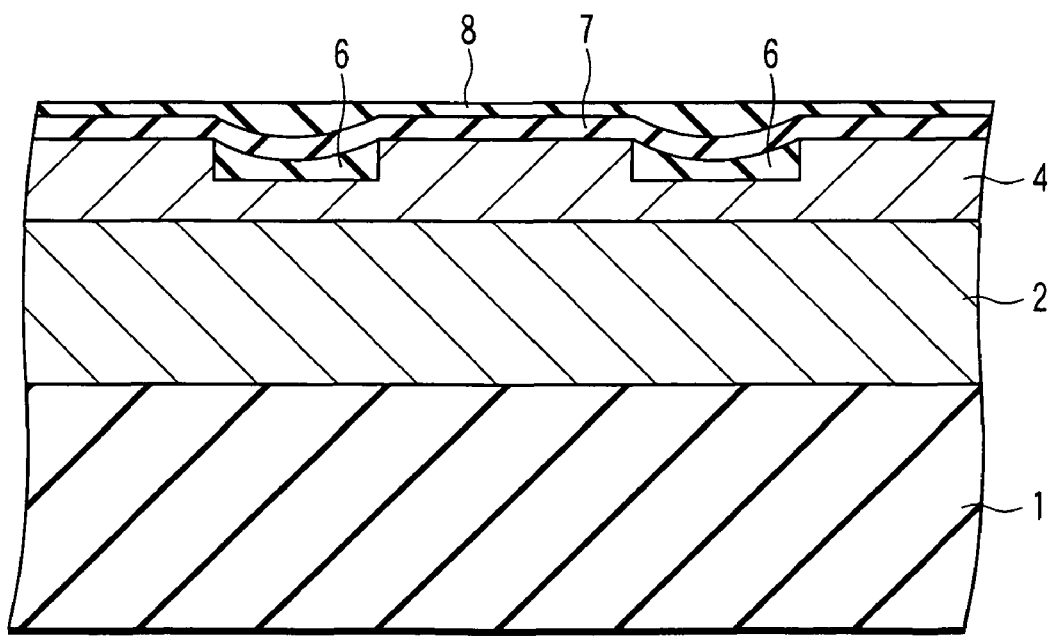
F I G. 8

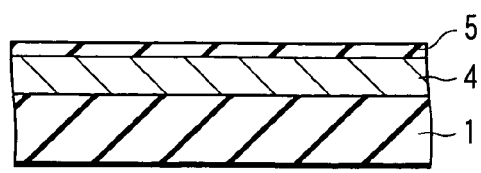
F I G. 9A
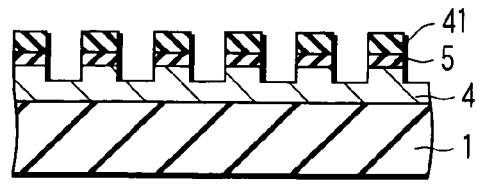
F I G. 9E
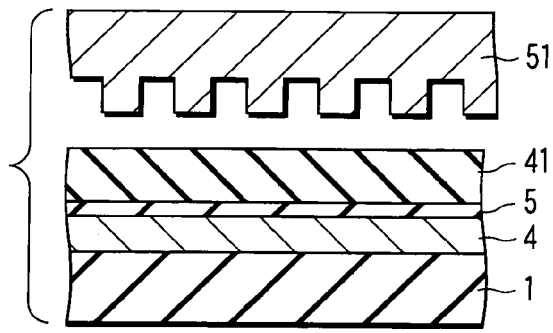
F I G. 9B
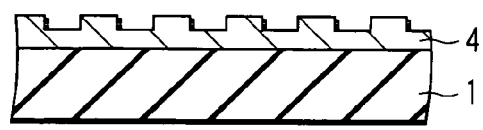
F I G. 9F
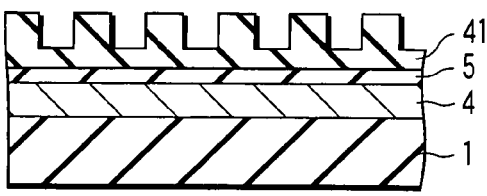
F I G. 9C
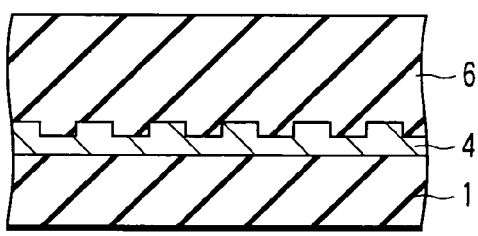
F I G. 9G
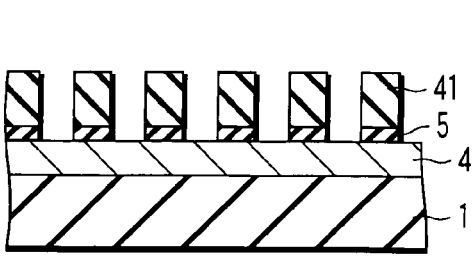
F I G. 9D
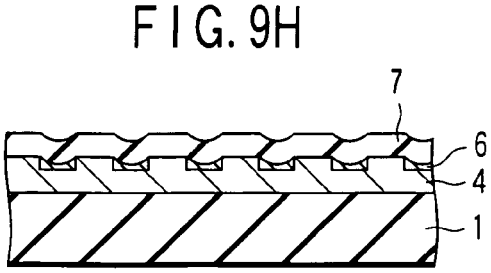
F I G. 9H
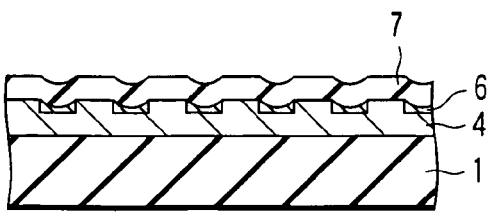
F I G. 9I

MAGNETIC RECORDING MEDIA AND MAGNETIC RECORDING DEVICE

CROSS-REFERENCE TO RELATED APPLICATIONS

This application is based upon and claims the benefit of priority from Japanese Patent Application No. 2005-279401, filed Sep. 27, 2005, the entire contents of which are incorporated herein by reference.

BACKGROUND

1. Field

One embodiment of the present invention relates to a magnetic recording media of the discrete track type and a magnetic recording device.

2. Description of the Related Art

Recently, in improving the track density of a hard disk drive (HDD), a problem of interference between adjacent tracks has become obvious. Especially, it is an important technical problem to reduce blur in writing operation due to the fringe effect of a write head magnetic field. A discrete track recording media (DTR media), which has its recording tracks physically separated, can reduce the side-erase phenomenon at the time of writing operation, side-read phenomenon in which information of adjacent tracks is mixed up at the time of reading operation, etc. Consequently, it is possible to greatly improve the track density. Accordingly, a magnetic recording media with high density can be provided.

On the other hand, in the conventional DTR media, since a servo signal is formed depending on absence or presence of magnetic recording layer, the servo signal intensity of the conventional DTR media is half that of a normal magnetic recording media having a continuous film, undesirably. The reason is as follows. In case servo writing is performed on a normal magnetic recording media having a magnetic recording layer being a continuous film, a servo signal is formed by upward magnetization (+1) and downward magnetization (−1). On the other hand, as for the conventional DTR media on which recesses are formed by completely etching a magnetic recording layer in the servo area, a servo signal is formed by magnetization (+1) and no magnetization (0). Accordingly, in principle, the servo signal intensity of the conventional DTR media is half that of a normal magnetic recording media having a continuous film. Thus anticipated reduction in signal intensity due to processing as well as reduction in servo signal-to-noise ratio (SNR) in principle is a crucial weak point for a drive having a DTR media loaded thereon.

In Jpn. Pat. Appln. KOKAI Publication No. 2000-306227, there is disclosed a magnetic recording media in which the depth of magnetic recording layer in the data area is different from that of magnetic recording layer in the servo area. However, in the magnetic recording media, the magnetic recording layer is completely separated by non-magnetic material in the servo area, and improvement of the servo SNR is not taken into consideration.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 7A and FIG. 7B are sectional views of a magnetic recording layer having patterns of protrusions and recesses in the recording track area of a magnetic recording media according to an embodiment of the present invention;

FIG. 8 shows a detailed sectional view of a magnetic recording layer having patterns of protrusions and recesses in the servo area of a magnetic recording media according to an embodiment of the present invention;

FIGS. 9A, 9B, 9C, 9D, 9E, 9F, 9G, 9H, and 9I are sectional views of steps of one example of the method of manufacturing a magnetic recording media according to an embodiment of the present invention.

DETAILED DESCRIPTION

Various embodiments according to the invention will be described hereinafter with reference to the accompanying drawings. In general, according to one embodiment of the present invention, there is provided a magnetic recording media comprising a magnetic recording layer formed on a substrate, wherein recording tracks and servo areas are prescribed as patterns of protrusions and recesses formed on the magnetic recording layer so that thin film portions of the magnetic recording layer are formed under the recesses, a thickness of magnetic recording layer at the thin film portion is smaller than a thickness of magnetic recording layer at the protrusion in the servo area, and a magnetization direction of the protrusion is antiparallel to a magnetization direction of the thin film portion in the servo area.

The present inventors produce a magnetic recording media (DTR media) in which recesses are formed in the servo area so that thin film portions of a magnetic recording layer are formed under the recesses, and the magnetization direction of protrusions of the magnetic recording layer is antiparallel to that of the thin film portions of the magnetic recording layer in the servo area, thereby making it possible to reduce the lowering of the SNR of a servo signal in the DTR media.

Example of the magnetic recording media according to the present invention will further be described below with reference to the accompanying drawings.

Figure 1:
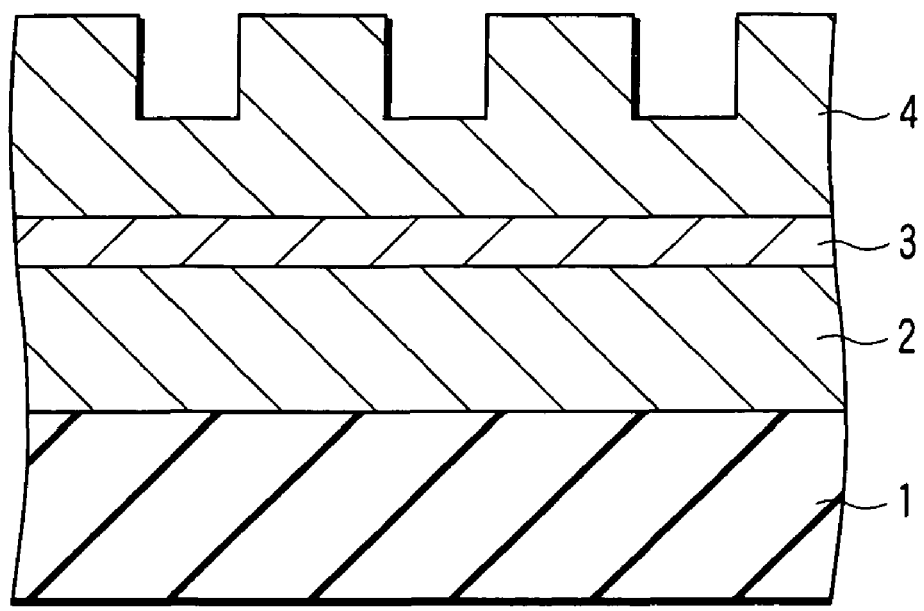
FIG. 1 is a sectional view of a magnetic recording layer having patterns of protrusions and recesses of a magnetic recording layer in the servo area of a magnetic recording media according to an embodiment of the present invention.

FIG. 1 is a schematic sectional view (down track direction) of one example of the servo area of a magnetic recording media (DTR media) according to the present invention. The DTR media has a soft underlayer 2, an intermediate layer 3 for orientation control or for grain size control, and a magnetic recording layer 4, which are stacked in this order on a substrate 1. In the servo area of the media, the magnetic recording layer 4 at the bottom of recesses is not removed completely, and the thickness of magnetic recording layer at the thin film portions is smaller than the thickness of magnetic recording layer at the protrusions. This structure can be obtained by etching the magnetic recording layer under the condition that at least part of the magnetic recording layer is left unremoved at the bottom of the recesses, which will be explained in detail afterward.

In the servo area, the magnetization direction of the protrusions is antiparallel to that of the thin film portions. As a method to antiparallelize the magnetization direction of the protrusions to that of the thin film portions, there is known one under which both the magnetization direction of the protrusions and that of thin film portions are directed to one direction by applying an external magnetic field using an electromagnet etc., and then either the magnetization direction of the protrusions or that of the thin film portions is inverted using a ring head. At the thin film portion of the recording layer, the magnetic field that the ring head generates is too weak for the magnetization direction to be inverted. By contrast, at the top of the protrusions of the recording layer, the magnetic field is strong enough to start inversion of the magnetization direction. Once the inversion of magnetization starts at the protrusions, it progresses toward the lower surface of the recording layer. In case of using a ring head, since a magnetic field from the head is directly applied to a return yoke, it is difficult for the magnetic field to reach the deep part of the magnetic recording layer. Accordingly, at the protrusions, magnetization direction of entire magnetic grains can be inverted, while at the thin film portions, magnetization direction is not inverted. Utilizing the phenomenon, only magnetization direction of the protrusions can be inverted again so that the magnetization direction of the protrusions is antiparallel to that of the thin film portions.

On the other hand, so as to antiparallelize between the magnetization direction of the protrusions and that of the thin film portions in the servo area, there may be employed a method of recording magnetization pattern under the matched timing using a record head. However, this method is technically difficult and there is a possibility that the cost to produce the media is increased.

Whether or not the magnetization direction of the protrusions is antiparallel to that of the thin film portions can be confirmed by observing the magnetization direction using a magnetic force microscope (MFM). The inversion of magnetization direction can be seen by cutting off part of the servo area of the media and performing magnetometry. When magnetization amount before applying magnetic field and magnetization amount after applying large magnetic field (20 kOe) in one direction are compared, in case there is confirmed a difference in absolute value, this fact is considered to be a collateral evidence that there existed two parts which are magnetized in reversed directions with respect to one another before applying magnetic field. This method is known as the remanence measurement. In case the media is loaded into a device, the state of magnetization can be checked by comparing signal intensity of the recording tracks and signal intensity of the servo area. When the protrusions and thin film portions are magnetized in the same direction, signal intensity of the servo area is half of signal intensity of the recording tracks or lower. On the other hand, in case such signal intensity relation cannot be seen, it can be determined that the magnetization direction of the protrusions is antiparallel to that of the thin film portions.

According to another embodiment of a magnetic recording media of the present invention, the magnetic recording layer comprises two or more magnetic layers which are stacked, and part of the two or more magnetic layers is removed in the magnetic recording layer at the recesses in the servo area, and coercivity of the protrusions may be different from that of the thin film portions in the servo area. Furthermore, a nonmagnetic layer may be inserted between the two or more magnetic layers. It is desirable that the two or more magnetic layers are exchange-coupled. Whether or not the two or more magnetic layers are exchange-coupled can be confirmed by checking the hysteresis loop. In case the magnetic layers are not exchange-coupled, overlapping loops of individual magnetic layers are obtained, while in case the magnetic layers are not exchange-coupled, a single loop or a multiple-stage loop is obtained. In case that a multiple-stage loop is obtained, when an asymmetrically loop with its center position deviated from zero magnetic field is obtained with minor loop measurement in each stage, it can be seen that the magnetic layers are exchange-coupled. The minor loop measurement is a measurement under which magnetic field is gradually decreased from the saturated magnetization state, and the magnetic field is increased again when a magnetization reversal occurs. In case of exchange-coupling two magnetic layers via a nonmagnetic layer, it is desirable that the thickness of the nonmagnetic layer is 2 nm or lower. The nonmagnetic layer does not have to be a continuous thin film. When at least part of two or more magnetic layers (for example, upper layer of two layers) which are exchange-coupled is removed by etching etc. to form the recesses, the magnetic property changes in the thin film portions, and magnetic field necessary to invert the magnetization direction or coercivity changes.

In the media, since coercivity of the protrusions is different from that of the thin film portions in the servo area, by applying large magnetic field using an electromagnet to direct both the magnetization direction of the protrusions and that of the thin film portions to one direction and then applying magnetic field which corresponds to the intermediate magnitude between coercivity of the protrusions and that of the thin film portions, either the magnetization direction of the protrusions or that of the thin film portions can be inverted again. As a result, the magnetization direction of the protrusions is antiparallel to that of the thin film portions in the servo area. Furthermore, in case the media is loaded into a device, by applying the maximum magnetic field of a head to the media so that both the magnetization direction of protrusions and that of thin film portions are directed to one direction and then reversely applying magnetic field of a head which corresponds to the intermediate magnitude between coercivity of the protrusions and that of the thin film portions, the magnetization direction of the protrusions is antiparallel to that of the thin film portions in the servo area. Furthermore, in case the media is loaded into a device, by applying large magnetic field to the media using an electromagnet from outside so that both the magnetization direction of protrusions and that of thin film portions are directed to one direction and then reversely applying magnetic field of a head which corresponds to the intermediate magnitude between coercivity of the protrusions and that of the thin film portions, the magnetization direction of the protrusions is antiparallel to that of the thin film portions in the servo area.

Hereinafter, an example of a media whose magnetic recording layer comprises two or more magnetic layers which are stacked, and in which, in the magnetic recording layer at the thin film portions in the servo area, part of the two or more magnetic layers is removed, and coercivity of the protrusions and that of the thin film portions are made different in the servo area will be explained.

Figure 2:
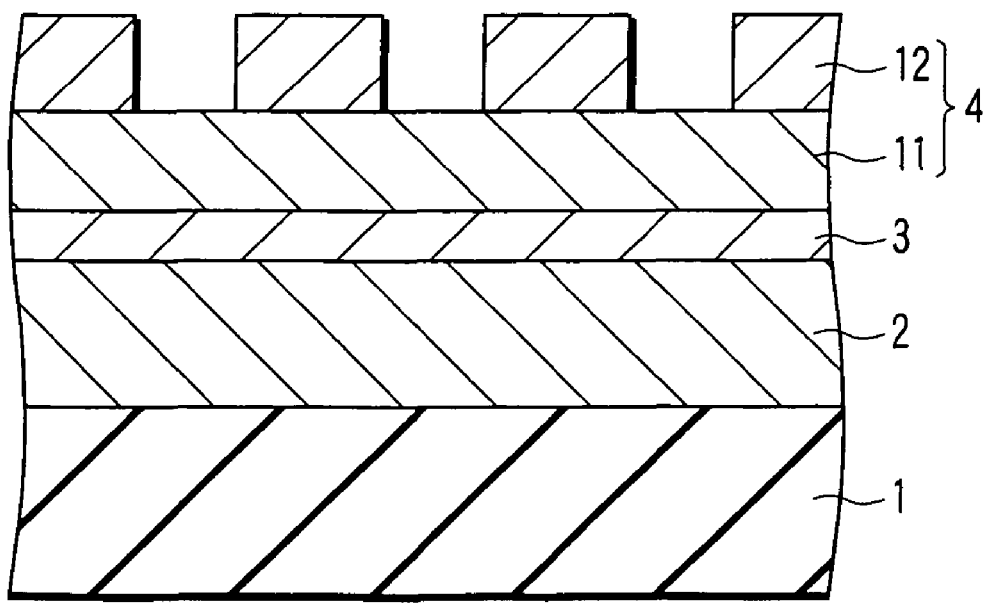
FIG. 2 is a sectional view of a magnetic recording layer having patterns of protrusions and recesses in the servo area of a magnetic recording media according to another embodiment of the present invention.

(a) FIG. 2 is a sectional view of a media that has a magnetic recording layer comprising a granular layer and a continuous layer which are stacked. This media has a soft underlayer 2, an intermediate layer 3, and a magnetic recording layer 4 that comprises a lower granular layer 11 and a topcoat layer 12, which are stacked in this order on a substrate 1. The lower granular layer 11 is of the granular structure in which, for example, magnetic particles of CoCrPt alloy which have a grain diameter of approximately 8 nm are dispersed in a matrix made of oxide such as $SiO_2$. The topcoat layer 12 is of continuous structure, and for example, is made of CoCrPt alloy and does not contain oxide. Since the lower granular layer 11 and the topcoat layer 12 which configure the magnetic recording layer 4 are exchange-coupled, the hysteresis loop is of one stage. Stacked films having such layer structure is referred to as a continuous granular coupled (CGC) media, and it is known that the media has an effect of improving recording performance of a perpendicular magnetic recording media.

According to the present invention, the media shown in FIG. 2 is manufactured by removing all or part of the topcoat layer 12 located at a predetermined position in the servo area to form the recesses. In the media shown in FIG. 2, since coercivity of the thin film portions is increased, it is possible to manufacture a media in which coercivity of the protrusions is different from that of the thin film portions in the servo area. So as to get larger coercivity difference, an additional element may be added to the topcoat layer to adjust the magnetic property.

Figure 3A:
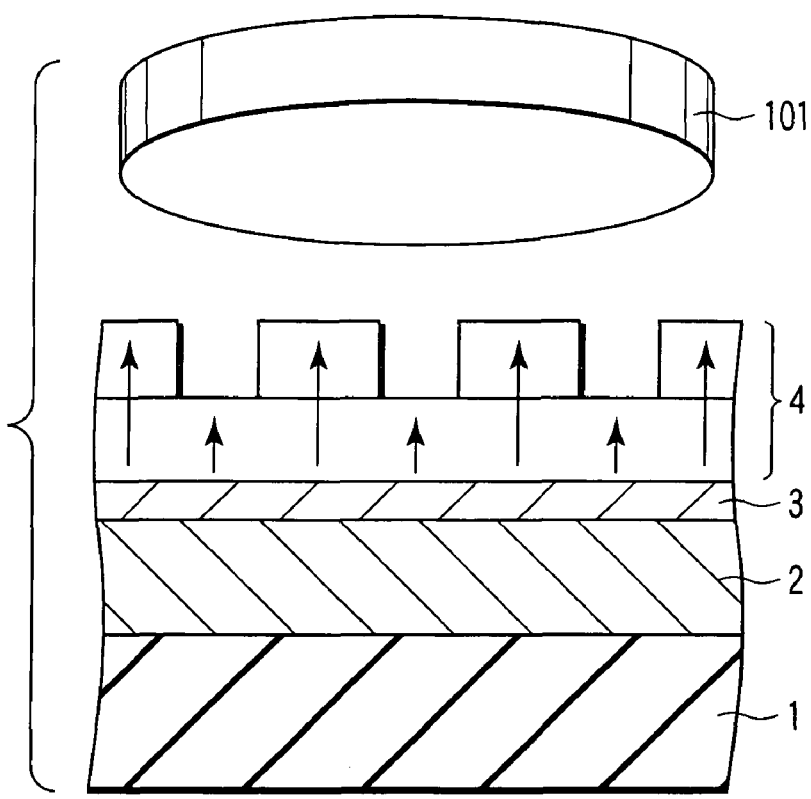
FIG. 3A and FIG. 3B are views of an example of a method of, in a magnetic recording layer of a magnetic recording media, antiparallelize the magnetization direction of the protrusions to that of thin film portions.
Figure 3B:
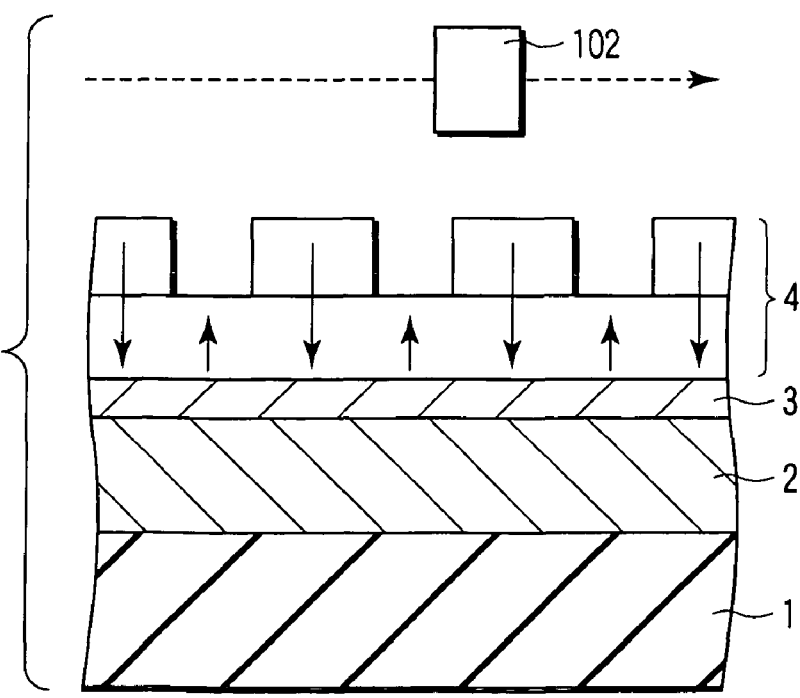

Referring to FIG. 3A and FIG. 3B, the method of antiparallelizing the magnetization direction of the protrusions to that of the thin film portions in the servo area shown in FIG. 2 will be explained. Firstly, as shown in FIG. 3A, large magnetic field is applied to a media using an electromagnet 101 to direct both the magnetization direction of the protrusions and that of thin film portions to one direction. Then, the media is loaded into a magnetic recording device (drive), and DC demagnetization is performed on the media in the opposite direction using a read/write head 102. Since the magnetic recording layer left at the recesses in the servo area (for example, lower granular layer 11) is large in coercivity, the read/write head cannot magnetize the left magnetic recording layer. Accordingly, the structure in which the magnetization direction of the protrusions is antiparallel to that of the thin film portions can be obtained.

Figure 4:
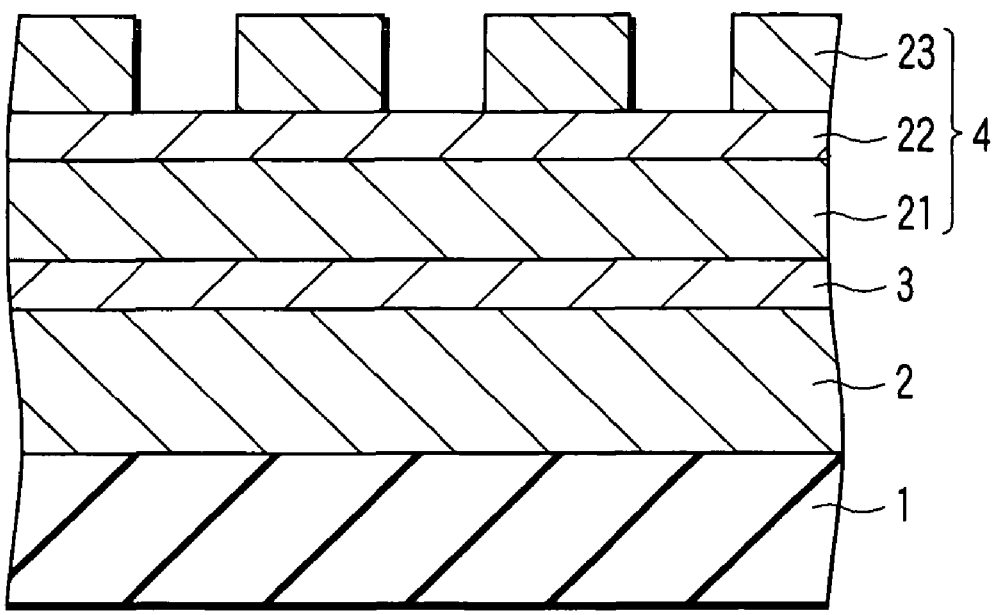
FIG. 4 is a sectional view of a magnetic recording layer having patterns of protrusions and recesses in the servo area of a magnetic recording media according to yet another embodiment of the present invention.

(b) FIG. 4 shows a sectional view of a media that has a magnetic recording layer of the antiferromagnetically coupled (AFC) structure. This media has a soft underlayer 2, an intermediate layer 3, and a magnetic recording layer 4 that comprises a lower ferromagnetic layer 21, a nonmagnetic metal layer 22, and an upper ferromagnetic layer 23, which are stacked in this order on a substrate 1. As the nonmagnetic metal layer 22, Ru, Ir, Rh, etc. are used. The thickness of the nonmagnetic metal layer 22 is set to 2 nm or lower. The lower ferromagnetic layer 21 and the upper ferromagnetic layer 23 are stacked via the nonmagnetic metal layer 22 under the antiferromagnetic coupling (AFC) which makes the state stable when magnetization direction of the lower ferromagnetic layer 21 is antiparallel to that of upper ferromagnetic layer 23. In the magnetic recording layer, the hysteresis loop is often of two stages. When the minor loop measurement is employed, a hysteresis loop of only the first stage is obtained.

In case the center of the loop is deviated from the zero magnetic field, the deviated amount is the magnitude of exchange magnetic field, and this fact is considered to be an evidence of the existence of the antiferromagnetic coupling. According to the present invention, the media shown in FIG. 4 is manufactured by removing all or part of the upper ferromagnetic layer 23 located at a predetermined position in the servo area to form the recesses. As a result, since coercivity of the thin film portions is decreased, it is possible to manufacture a media in which coercivity of the protrusions is different from that of the thin film portions in the servo area.

Figure 5:
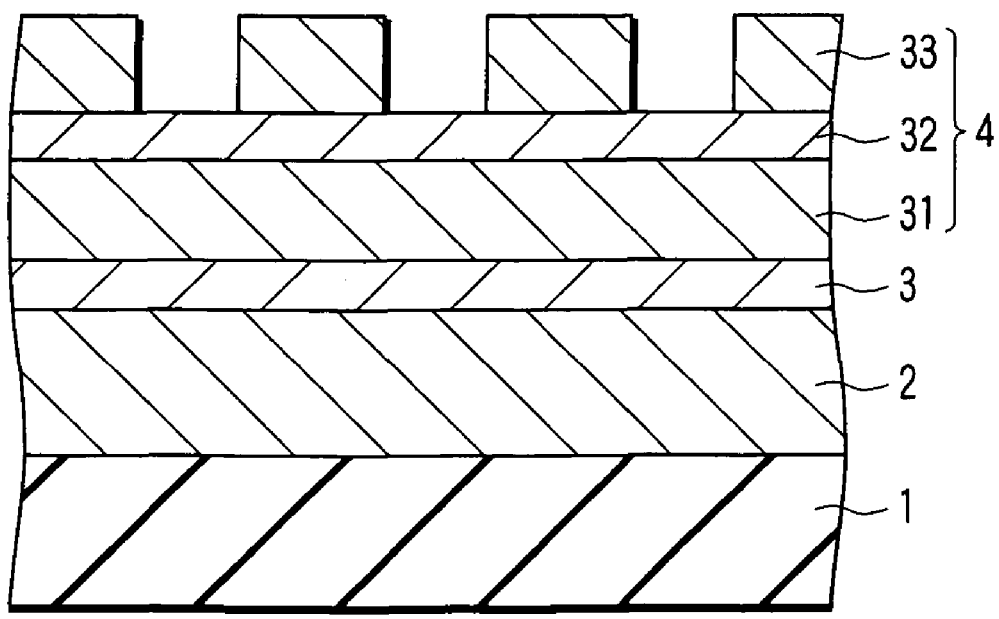
FIG. 5 is a sectional view of a magnetic recording layer having patterns of protrusions and recesses of a magnetic recording layer in the servo area of a magnetic recording media according to yet another embodiment of the present invention.

(c) FIG. 5 shows a sectional view of a media that has a magnetic recording layer of the exchange coupled composite (ECC) structure. This media has a soft underlayer 2, an intermediate layer 3, and a magnetic recording layer 4 that comprises a ferromagnetic layer 31, a nonmagnetic metal layer 32, and a soft magnetic layer 33 of the granular structure, which are stacked in this order on a substrate 1. In case the ferromagnetic layer 31 and the soft magnetic layer 33 of the granular structure are exchange-coupled via the nonmagnetic metal layer 32, the hysteresis loop is of one stage, and it is known that the coercivity is small as compared with the case of single ferromagnet. Specifically, since the ferromagnetic layer 31 and the soft magnetic layer 33 are exchange-coupled, the magnetization direction is inclined obliquely. As a result, effective coercivity can be lowered. This structure is known as an ECC media. According to the present invention, the media shown in FIG. 5 is manufactured by removing all or part of the soft magnetic layer 33 located at a predetermined position in the servo area to form the recesses. As a result, since coercivity of the thin film portions is increased, it is possible to manufacture a media in which coercivity of the protrusions is different from that of the thin film portions in the servo area.

Furthermore, there may be used a magnetic recording layer having a soft magnetic layer, a nonmagnetic metal layer, and a ferromagnetic layer, which are stacked. In this case, when removing all or part of the ferromagnetic layer located at a predetermined position in the servo area to form the recesses, since coercivity of the thin film portions is decreased, it is possible to manufacture a media in which coercivity of the protrusions is different from that of the thin film portions in the servo area.

Figure 6:
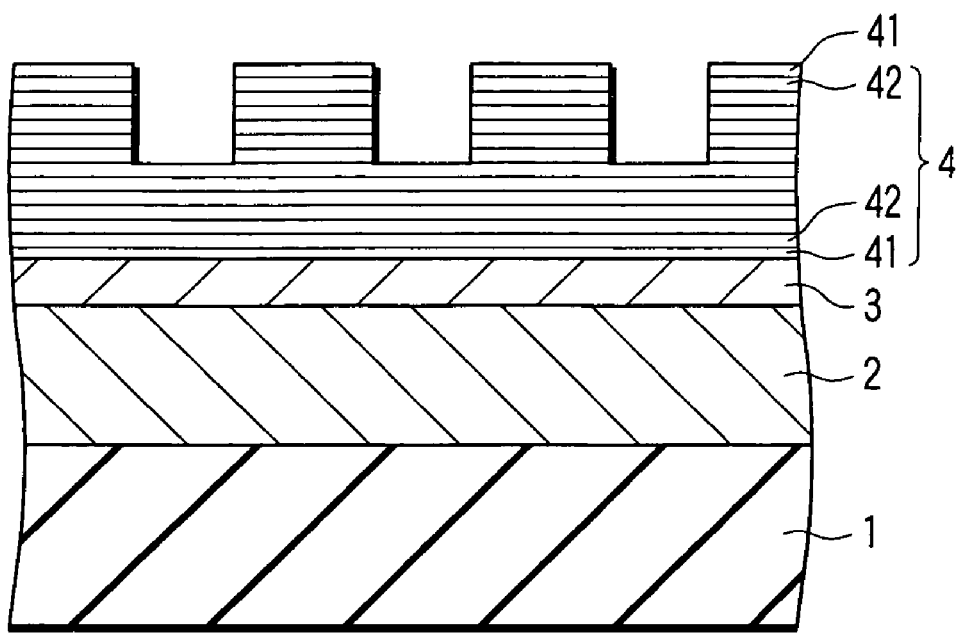
FIG. 6 is a sectional view of a magnetic recording layer having patterns of protrusions and recesses in the servo area of a magnetic recording media according to yet another embodiment of the present invention.

(d) FIG. 6 shows a sectional view of a media that has a magnetic recording layer being a multilayer film. This media has a soft underlayer 2, an intermediate layer 3, and a magnetic recording layer 4 are stacked in this order on a substrate 1. The magnetic recording layer 4 is a multilayer film including a plurality of ferromagnetic recording layer 41 and a plurality of nonmagnetic metal layers 42 which are stacked alternately. According to the present invention, the media shown in FIG. 6 is formed by removing part of the multilayer film configuring the magnetic recording layer 4 located at a predetermined position in the servo area to form the recesses. As a result, since the number of layers forming the multilayer film is reduced and thus coercivity of the thin film portions is decrease, it is possible to manufacture a media in which coercivity of the protrusions is different from that of the thin film portions in the servo area.

Coercivity of the protrusions and thin film portions of the media can be measured by the measurement employing the vibrating sample magnetometer (VSM) and the Kerr effect measurement utilizing the magnetic Kerr effect. The Kerr effect measurement can remove the influence of the soft magnetic layer.

In case of finely adjusting the coercivity of the protrusions and thin film portions of the magnetic recording layer in the servo area, the following methods can be employed.

(1) In etching parts corresponding to the recesses, damage is caused to the ferromagnetic layer. For example, the acceleration voltage of Ar ion milling is increased. Accordingly, defect is induced in the ferromagnetic layer, which reduces the coercivity.

(2) In etching parts corresponding to the recesses, ions are irradiated. By irradiating ions with energy smaller than the etching energy, the magnetic property can be changed. In some cases, the coercivity is increased, and in other cases, the coercivity is decreased.

(3) Chemical reaction such as oxidation is caused at parts corresponding to the thin film portions. After etching the recesses, the thin film portions are exposed to active gas such as oxygen or fluorine. Accordingly, chemical reactions such as oxidation or fluorination are caused at magnetic material of the thin film portions, and the magnetic property is changed. In some cases, the coercivity is increased, and in other cases, the coercivity is decreased. There may be employed a method under which active gas is ionized, and thus ionized active gas is accelerated by an energy to be irradiated to the media. Accordingly, there is brought about an effect of facilitating chemical reactions. On the other hand, the device becomes of large scale, and the cost to produce the media is undesirably increased.

Figure 7A:
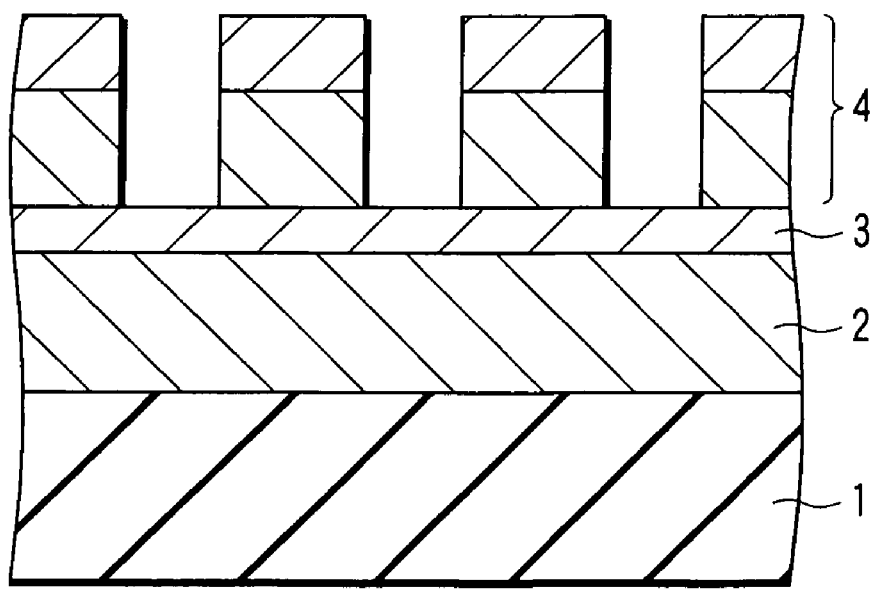

In the magnetic recording media according to the present invention, the cross-sectional structure of the recording track area is not particularly restricted. The magnetic recording layer 4 may be isolated, as shown in FIG. 7A. Otherwise, the magnetic recording layer 4 do not have to be isolated, as shown in FIG. 7B. From the viewpoint of media noise, it is desirable that the magnetic recording layer 4 be isolated, as shown in FIG. 7A. On the other hand, it is significantly difficult to produce a DTR media in which the magnetic recording layer is not isolated in the servo area and the magnetic recording layer is isolated only in the recording track area. In case the magnetic recording layer 4 is a recording layer having a topcoat layer, or in case the media is the ECC media, a read/write head cannot write since the coercivity of the thin film portions is large. So, since media noise such as side-fringe is considerably reduced, the cross-sectional structure of the recording track area and that of the servo area may be equal with each other, as shown in FIG. 7B.

In above-described explanation, the magnetic recording media is simplified to be shown. Typically, as shown in FIG. 8, the magnetic recording media has nonmagnetic layer 6 which fills the recesses of the magnetic recording layer 4, and protective layer 7 which covers the magnetic recording layer 4 and the nonmagnetic layer 6.

Referring to FIG. 9A to FIG. 9I, one example of the method of producing the magnetic recording media according to the present invention will be explained.

As shown in FIG. 9A, the soft underlayer, intermediate layer, magnetic recording layer 4, and a protective layer 5 are stacked in this order on the substrate 1. For simplification, the soft underlayer and intermediate layer are not shown.

As shown in FIG. 9B, a resist film 41 of approximately 200 nm in thickness is formed on the protective layer 5 in the spin coat. Then, a stamper 51 having patterns of protrusions and recesses corresponding to the patterns of the protrusions and recesses in the recording track area and in the servo area to be formed is pressed to the resist 41 under 2000 bar for 60 seconds to transfer the patterns to the resist 41 (high pressure imprint).

The press machine will be explained briefly. The press machine has a bottom plate and a top plate forming a die set. There are stacked, on the bottom plate of the die set, a buffer layer made of polyethylene terephthalate (PET) of 0.1 nm in thickness, a substrate, a stamper, in this order. The resist film surface of the substrate and the surface having the protrusions and recesses of the stamper are so arranged as to face each other. The top plate of the die set is arranged on the upper portion of the stamper, and the bottom plate and the top plate of the die set sandwich the buffer layer, substrate, and stamper. Press is performed in this manner. The retention time of 60 seconds corresponds to the movement time of the resist.

As shown in FIG. 9C, after the press operation, the stamper 51 is removed using vacuum tweezers. Since the stamper 51 has fluorinated parting agent coated thereon, the resist 41 is not attached to the stamper 51. Since the height of protrusions and recesses of patterns formed by the imprint process is approximately 60 to 70 nm, the film thickness of resist residue left at the recesses of the transferred patterns is approximately 120 nm.

As shown in FIG. 9D, resist residue is removed by oxygen gas reactive ion etching (RIE). As plasma source, the inductively coupled plasma (ICP) that can generate plasma of low pressure and high density is desirable. On the other hand, the electron cyclotron resonance (ECR) plasma, or a commonly used normal type RIE device may be employed. In this embodiment, the ICP etching device is used, with the chamber pressure set to 2 m Torr, while the coil RF and platen RF is set to 100 W respectively. Etching is carried out for 30 seconds, and the resist residue which is formed at the recesses in the imprint process is removed. By performing the etching, the protective layer 5 located at the surface of the recesses can also be removed along with the removal of resist residue.

As shown in FIG. 9E, after removing the resist residue, using the resist 41 located at the upper portion of the protrusions of the patterns as an etching mask, the magnetic recording layer 4 is etched. In the present invention, at the recesses of the patterns, the magnetic recording layer 4 is etched under the condition that entire part thereof is not removed so that part thereof is left. In etching the magnetic recording layer 4, etching using an Ar ion beam (Ar ion milling) is desirable. On the other hand, RIE using Cl gas or mixed gas of CO and $NH_3$ may be employed. In case of employing RIE using mixed gas of CO and $NH_3$, as the etching mask, hard mask made of such as Ti, Ta, W has to be used. In case such RIE is employed. to etch the magnetic recording layer 4, there is formed no taper on the protrusions and recesses of the magnetic recording layer 4. In this embodiment, the magnetic recording layer 4 is processed by employing Ar ion milling under which any material can be etched. Etching is performed by setting the acceleration voltage to 400 V, and varing the ion incident angle from 30° to 70°.

As shown in FIG. 9F, after etching the magnetic recording layer 4, the resist 41 used as the etching mask is removed. In case general photoresist is used, the resist can be easily removed by performing oxygen-plasma processing. In this embodiment, the resist 41 is completely removed using an oxygen-ashing device by performing the processing of 5 minutes under the condition of 1 Torr and 400 W. Along with the removal of the resist 41, the protective layer 5 located at the surface of the protrusions is also removed. On the other hand, in case SOG is used as the etching mask, this process has to be done by RIE using fluorinated gas. As fluorinated gas, $SF_6$ is desirable, in which case water washing has to be performed since HF or acid such as $H_2SO_4$ may be raised due to the reaction with water in the atmosphere.

As shown in FIG. 9G, after removing the resist 41, the protrusions and recesses are filled with the nonmagnetic layer 6. The coating processing is performed by forming a film of non-magnetic material employing the bias sputtering method or general sputtering method. The non-magnetic material can be widely selected from oxide such as $SiO_2$, $TiO_x$, $Al_2O_3$, nitride such as $Si_3N_4$, AlN, TiN, carbide such as TiC, boride such as BN, element substance such as C, Si. The bias sputtering method is a method under which a substrate is biased and a film is formed by sputtering, which can easily fill the recesses with the material and form a film. On the other hand, since dissolution of substrate due to the substrate bias and sputtering dust are prone to be raised, it is desirable that the general sputtering method be employed. In this embodiment, sputtering is performed by applying DC 500 W to a C target under 9 Pa. When observing the surface of the discrete track media on which the nonmagnetic layer 6 of approximately 100 nm in thickness is formed using an atomic force microscope (AFM), the coating processing is desirably carried out with Ra=0.6 nm where there can be hardly seen the protrusions and recesses. On the other hand, the filling can be performed by employing a spin coat of SOG. The number of revolutions for spin coating is adjusted to determine the thickness so that the protrusions and recesses formed by etching are completely filled.

As shown in FIG. 9H, after forming the nonmagnetic layer 6, etch-back processing is performed until the top of the protrusions of the magnetic recording layer 4 are exposed. The roughness (Ra) of media surface after the etch-back is 0.6 nm. It is desirable that the etch-back processing be performed by employing Ar ion milling. On the other hand, in case silicon coating material such as $SiO_2$ is used, RIE using fluorinated gas can be employed. Etching using an ECR ion gun can also be employed. In this embodiment, ion milling is performed for ten minutes with the acceleration voltage set to 400 V and the ion incident angle set to 30°, and the etch-back processing is carried out until the top of the protrusions of the magnetic recording layer 4 are completely exposed.

As shown in FIG. 9I, after the etch-back, the C protective layer 7 is formed. In forming the C protective layer 7, it is desirable that CVD be employed to form a film so as to attain desirable coverage for the protrusions and recesses. The C protective layer 7 may be formed by employing sputtering or vacuum deposition. In case of employing CVD, a DLC film containing much $sp^3$ bonded carbon is formed. In case the film thickness is equal to 2 nm or lower, the coverage becomes undesirable. On the other hand, in case the film thickness is equal to 10 nm or higher, the magnetic spacing between the read/write head and the media is enlarged to lower the SNR, which is also an undesirable case. In this example, the C protective layer 7 of 4 nm in thickness is formed by employing the CVD. Furthermore, a lubricating layer is covered on the C protective layer 7.

In this embodiment, the high pressure imprint method is employed as an example, while other imprint methods can be employed to manufacturing the magnetic recording media of the present invention.

Figure 10:
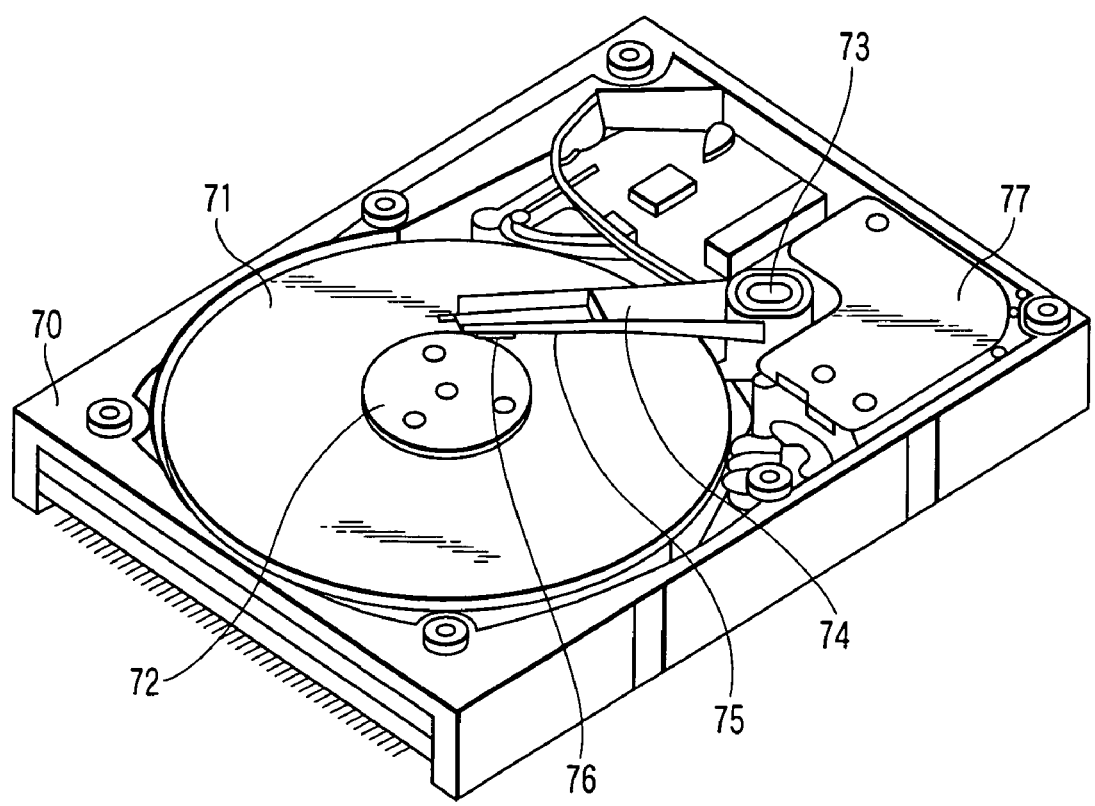
FIG. 10 is a perspective view of a magnetic recording device according to an embodiment of the present invention.

Next, the configuration of the drive using the DTR media according to the present invention will be explained with reference to FIG. 10 briefly. FIG. 10 shows a schematic perspective view of one example of the magnetic recording device according to the present invention. This magnetic recording device has a housing 70 which has arranged therein a magnetic disk 71, a head slider 76 including a magnetic head, a head suspension assembly (a suspension 75 and an actuator arm 74) that holds the head slider 76, a voice coil motor (VCM) 77, and a circuit board.

The magnetic disk (discrete track media) 71 is mounted to a spindle motor 72 to be rotated, and various digital data is written thereto by employing the perpendicular magnetic recording method. The head slider 76 has built therein a magnetic head of complex type that includes a write head of the magnetic monopole configuration and a read head using a shield-type magnetoresistive (MR) read element (giant magnetoresistive (GMR) film, tunneling magnetoresistive (TMR) film, etc.). The suspension 75 is held at one end of the actuator arm 74, and the head slider 76 is so held as to face the recording surface of the magnetic disk 71 by the suspension 75. The actuator arm 74 is fixed to a pivot 73. The voice coil motor (VCM) 77 is arranged on the other end of the actuator arm 74. The voice coil motor (VCM) 77 drives the head suspension assembly, and sets the magnetic head at a position of an arbitrary radius on the magnetic disk 71. The circuit board has arranged thereon a head IC, and generates a drive signal for the voice coil motor (VCM) 77 and a control signal for controlling the reading and writing operation by the magnetic head.

EXAMPLES

The present invention will be explained in detail referring to examples of embodiments.

Example 1

In the present embodiment, the DTR media whose servo area has the structure shown in FIG. 2 is manufactured. On the substrate 1, the soft underlayer 2 made of CoZrNb having a thickness of 120 nm, the intermediate layer 3 made of Ru having a thickness of 20 nm, and the magnetic recording layer 4 that comprises the lower granular layer 11 made of CoCrPt-$SiO_2$ having a thickness of 10 nm and the topcoat layer 12 made of CoCrPt having a thickness of 10 nm are stacked in this order. Then, a DLC film is formed as a protective layer. After forming the DLC film, the magnetic recording layer 4 is processed by employing the imprint method. In this processing, only the topcoat layer 12 is etched with the etching depth set to 10 nm, thereby obtaining a media having the structure shown in FIG. 2.

As shown in FIG. 2, the magnetic recording layer 4 is not completely separated in the depth direction, and coercivity of the protrusions is different from that of thin film portions. In the present invention, the lower granular layer 11 and the topcoat layer 12 are exchange-coupled. The coercivity of the protrusions having the lower granular layer 11 and the topcoat layer 12 is 4 kOe, while the coercivity of the thin film portions having only the lower granular layer 11 is 5 kOe. In this way, since the coercivity of the thin film portions whose topcoat layer is removed is enlarged, and the magnetic spacing is increased, the magnetization direction of the thin film portions cannot be inverted by magnetic field of a read/write head. On the other hand, the magnetization direction of the protrusions can be inverted by magnetic field of a read/write head.

DC demagnetization is performed on the DTR media having said structure in one direction using a powerful electromagnet. Then, the DTR media is loaded into a magnetic recording device (drive), and DC demagnetization is performed on the DTR media in the opposite direction using a read/write head. Since magnetization direction of the thin film portions cannot be inverted by the read/write head due to enlarged coercivity, it is possible to form a structure in which the magnetization direction of the protrusions is antiparallel to that of the thin film portions in the servo area. When observing a servo readout signal from the drive using an oscilloscope, amplitude of 90 mA can be seen.

Reference Example

Servo writing is performed on a general perpendicular magnetic recording media, not a DTR media, which is not etched and has a continuous film. Then, the general recording media is loaded to a drive. The signal output of the drive is 100 mA.

Comparative Example

As a comparative example, a conventional DTR media is manufactured by completely etching a magnetic recording layer in the servo area to form recesses with the etching depth set to 20 nm. DC demagnetization is performed on the DTR media having said structure in one direction using a powerful electromagnet. After loading the DTR media into a drive, a servo readout signal of 50 mA is observed.

In case servo writing is performed on a continuous film, a servo signal is formed by upward magnetization (+1) and downward magnetization (−1). On the other hand, as for the conventional DTR media, a servo signal is formed by magnetization (+1) and no magnetization (0). Accordingly, in principle, the servo signal output of the conventional DTR media is half that of a normal media having a continuous film, undesirably. On the other hand, it can be seen that, even if output is slightly lowered as compared with the continuous film, the DTR media in the example 1 can obtain a servo signal output that is twice that of the media in the comparative example.

It is desirable that only the topcoat layer is removed with the etching depth set to 10 nm. In case the etching depth is set to 5 to 15 nm, a difference can be made between coercivity of the protrusions and that of the thin film portions, and similar effect can be obtained.

Example 2

In the present embodiment, the DTR media whose servo area has the structure shown in FIG. 4 is manufactured. On the substrate 1, the soft underlayer 2 made of CoZrNb having a thickness of 120 nm, the intermediate layer (seed layer) 3 made of NiFeCr having a thickness of 20 nm, and the magnetic recording layer 4 that comprises the lower ferromagnetic layer 21, the nonmagnetic metal layer 22 made of Ru having a thickness of 0.5 nm, and the upper ferromagnetic layer 23, are stacked in this order. The lower ferromagnetic layer 21 is a multilayer film [Co(0.3 nm)/Pd(1.0 nm)]$_5$ having five Co films of 0.3 nm and five Pd films of 1.0 nm which are stacked alternately. The upper ferromagnetic layer 23 is a multilayer film [Co(0.3 nm)/Pd(1.0 nm)]$_{10}$ having ten Co films of 0.3 nm and ten Pd films of 1.0 nm which are stacked alternately. Then, after forming the magnetic recording layer, a DLC film is formed on the magnetic recording layer as a protective layer. After forming the DLC film, the magnetic recording layer 4 is processed by employing the imprint method. In this processing, only the upper ferromagnetic layer 23 is etched with the etching depth set to 13 nm, thereby obtaining a media having the structure shown in FIG. 4.

In this embodiment, the lower ferromagnetic layer 21 and the upper ferromagnetic layer 23 are stacked via the nonmagnetic metal layer 22 under the antiferromagnetic coupling (AFC). In this structure, coercivity of the protrusions becomes large due to the antiferromagnetic coupling, while coercivity of the thin film portions becomes small since antiferromagnetic coupling does not act therein. Coercivity of the protrusions is 4 kOe, while coercivity of the thin film portions is 1.5 kOe.

DC demagnetization is performed on the media having said structure in a manner similar to that in the example 1. After loading the media into a drive, a servo signal intensity of 70 mA is observed. When etching is performed to the depth of 5 to 15 nm, similar effect can be obtained.

In this case, the signal intensity becomes small. The reason is that since parts of small coercivity correspond to the thin film portions, the magnetic spacing becomes large, which prevents complete demagnetization by a read/write head.

Example 3

In the present embodiment, the DTR media whose servo area has the structure shown in FIG. 5 is manufactured. On the substrate 1, the soft underlayer 2 made of CoZrNb having a thickness of 120 nm, the intermediate layer (seed layer) 3 made of PdSiO having a thickness of 20 nm, and the magnetic recording layer 4 that comprises the ferromagnetic layer 31 being a multilayer film [Co(0.3 nm)/Pd(1.0 nm)]$_5$, the nonmagnetic metal layer 32 made of PdSi, and the soft magnetic layer 33 of the granular structure are stacked in this order. Then, after forming the magnetic recording layer, a DLC film is formed on the magnetic recording layer as a protective layer. After forming the DLC film, the magnetic recording layer 4 is processed by the imprint method. In this processing, only the soft magnetic layer 33 is etched with the etching depth set to 6.5 nm, thereby obtaining a media having the structure shown in FIG. 5.

In the present embodiment, the ferromagnetic layer 31 and the soft magnetic layer 33 are exchange-coupled via the nonmagnetic metal layer 32, forming the ECC structure. The magnetic recording layer 4 is provided with the thermal fluctuation resistance that fulfills KuV/kT=110. In general, Hc of the magnetic recording layer which can attain the value is approximately 8 kOe, which is significantly high. On the other hand, since the protrusions of the ECC structure have their magnetization direction inclined obliquely as compared with a direction perpendicular to the film surface, effective coercivity is reduced. Accordingly, the magnetization direction of the protrusions can be sufficiently inverted using a head that can perform writing operation to the magnetic recording layer of 4 kOe in coercivity. On the other hand, since the thin film portions are not subject to the exchange coupling, the magnetization direction of the thin film portions cannot be inverted using the head.

DC demagnetization is performed on the media having said structure in a manner similar to that in the example 1. After loading the media into a drive, a servo signal intensity of 80 mA is observed. When etching is performed to the depth of 5 to 15 nm, similar effect can be obtained.

Example 4

In the present embodiment, the DTR media whose servo area has the structure shown in FIG. 1 is manufactured. On the substrate 1, the soft underlayer 2 made of CoZrNb having a thickness of 120 nm, the intermediate layer 3 made of Ru having a thickness of 20 nm, and the magnetic recording layer 4 made of CoCrPt–SiO$_2$ having a thickness of 20 nm are stacked in this order. Then, a DLC film is formed as a protective layer. After forming the DLC film, the magnetic recording layer 4 is etched to the depth of 13 nm by the imprint method, thereby obtaining a media having the structure shown in FIG. 1.

DC demagnetization is performed on the DTR media having said structure in one direction using a powerful electromagnet. Then, the DTR media is magnetized in the opposite direction using a ring head. Being large in magnetic spacing with the head, the magnetization direction of the process is not inverted by the head. After loading the media into a drive, a servo signal intensity of 80 mA is observed. When etching is performed to the depth of 5 to 15 nm, similar effect can be obtained.

In case a signal of 20 MHz is written to the recording tracks of the recording media, the signal output of 100 mA is measured. In case only protrusions are magnetized such as a conventional DTR media in which the recording layer is completely separated in the depth direction in the servo area, the signal intensity in the servo area has to be half that of recording tracks or lower. On the other hand, according to the media of the present invention, the signal intensity in the servo area is 0.9 times that of recording tracks. Accordingly, it is determined that the magnetization direction of the protrusions is antiparallel to that of the thin film portions.

To confirm whether or not the magnetization direction of the protrusions is antiparallel to that of the thin film portions in the servo area, magnetic force microscope (MFM) observation is performed. When observing the media in the present embodiment, a black contrast (+1) is obtained at part corresponding to a burst signal, while a white contrast (−1) is obtained at part surrounding the burst signal. Since the contrast of the MFM reflects the direction of spin, it can be seen that the spin in the protrusions is antiparallel to the spin in the thin film portions in the servo area.

For comparison, in case of carrying out MFM measurement for a conventional DTR media that is produced by performing etching to the depth of 20 nm, and completely removing the magnetic recording layer to form recesses, a black contrast (+1) is obtained at part corresponding to a burst signal, while a gray contrast (0) is obtained at part surrounding the burst signal part. Since the gray contrast reflects the state of no spin (or spin in the horizontal direction), it can be seen that the direction of spin is one direction in the conventional DTR media.

Example 5

In the present embodiment, the DTR media whose servo area has the structure shown in FIG. 6 is manufactured. On the substrate 1, the soft underlayer 2 made of CoZrNb having a thickness of 120 nm, the intermediate layer (seed layer) 3 made of NiFeCr having a thickness of 20 nm, and the magnetic recording layer 4 are stacked in this order. The recording layer 4 is a multilayer film [Co(0.3 nm)/Pd(1.0 nm)]$_{15}$. Then, after forming the magnetic recording layer, a DLC film is formed on the magnetic recording layer as a protective layer. After forming the DLC film, the magnetic recording layer 4 is etched to the depth of 13 nm by employing the imprint method, thereby obtaining a media having the structure shown in FIG. 6. When the media is observed using a cross-section transmission electron microscopy (TEM), there is left [Co(0.3 nm)/Pd(1.0 nm)]$_5$ at the thin film portions. Coercivity of the protrusions is 4 kOe, while coercivity of the thin film portions is 2 kOe.

DC demagnetization is performed on the DTR media having said structure in a manner similar to that in the example 1. After loading the DTR media into a magnetic recording device (drive), a servo signal intensity of 70 mA is observed. When etching is performed to the depth of 10 to 15 nm, similar effect can be obtained.

Hereinafter, materials used for the respective layers and a laminated structure of the respective layers of the magnetic recording medium according to the embodiment of the invention will be described.

<Substrate>

Examples of a substrate include a glass substrate, an Al-based alloy substrate, a ceramic substrate, a carbon substrate, and an Si single-crystal substrate. As a glass substrate, amorphous glass or single-crystal glass can be used. Examples of amorphous glass include soda lime glass and aluminosilicate glass. Examples of crystallized glass include lithium crystallized glass. A ceramic substrate may be, for example, a sintered body consisting substantially of aluminum oxide, aluminum nitride, silicon nitride, or the like, or one obtained by fiber-reinforcing those sintered bodies. An Si single-crystal substrate, i.e., a silicon wafer may have an oxide film on the surface thereof. Further, one obtained by forming an NiP layer on the above-described metal substrate or a nonmetal substrate by plating or sputtering can be used. And, as a method of forming thin film on the substrate, not only the sputtering described above but also vacuum evaporation and plating can be used.

<Soft underlayer>

The soft underlayer of the perpendicular two-layer medium is provided for allowing a writing magnetic field from a magnetic pole to pass through, and for allowing the recording magnetic field to return to a return yoke arranged in the vicinity of the magnetic pole. Namely, the soft underlayer serves as one part of functions of a write head, and functions as a part of improving a writing efficiency by applying a precipitous perpendicular magnetic field to the recording layer.

As the soft underlayer, a high permeability material including at least one of Fe, Ni and Co is used. Examples of the material include an FeCo-based alloy such as FeCo or FeCoV; an FeNi-based alloy such as FeNi, FeNiMo, FeNiCr, or FeNiSi; an FeAl-based and FeSi-based alloy such as FeAl, FeAlSi, FeAlSiCr, FeAlSiTiRu, or FeAlO; an FeTa-based alloy such as FeTa, FeTaC, or FeTaN; and an FeZr-based alloy such as FeZrN.

As the soft underlayer, a material may be used which has a microcryatalline structure such as FeAlO, FeMgO, FeTaN, or FeZrN containing 60 at % or more of Fe, or a granular structure in which fine crystal particles are dispersed in a matrix.

Examples of the material of the soft underlayer further include a Co alloy containing Co and at least one of Zr, Hf, Nb, Ta, Ti and Y. 80 at % or more of Co is preferably contained therein. When such a Co alloy is formed to be a film by sputtering, an amorphous layer is easy to form. An amorphous soft magnetic material has no crystalline magnetic anisotropy, crystalline defect, or grain boundary, and thus exhibits an extremely excellent soft magnetisation. By using an amorphous soft magnetic material, an attempt can be made to make a noise of a medium lower. Examples of a suitable amorphous soft magnetic material include CoZr-, CoZrNb-, and CoZrTa-based alloys.

Under the soft underlayer, an underlayer may be also provided in order to improve the crystallinity of the soft underlayer, or to improve the adherence of the soft under layer to the substrate. Examples of a material of the underlayer include Ti, Ta, W, Cr and Pt, or an alloy containing those, or an oxide or a nitride thereof.

An intermediate layer composed of a nonmagnetic material may be provided between the soft underlayer and the perpendicular magnetic recording layer. A role of the intermediate layer is to cut off exchange coupling interaction between the soft magnetic underlayer and the recording layer, and to control the crystallinity of the recording layer. Examples of a material of the intermediate layer include Ru, Pt, Pd, W, Ti, Ta, Cr, and Si, or an alloy containing those, or an oxide or a nitride thereof.

In order to prevent a spike noise, the soft underlayer may be comprising of a plurality of layers, and have a Ru film having thickness of 0.5 to 1.5 nm interposed therebetween, whereby anti-ferromagnetic coupling may be carried out. In addition, the soft magnetic layer may be exchange coupled to a hard magnetic film having in-plane anisotropy, such as CoCrPt, SmCo, or FePt, or a pinning layer composed of an antiferromagnetic material such as IrMn or PtMn. In this case, a magnetic layer, for example, Co, or a nonmagnetic layer, for example, Pt may be laminated above and under an Ru layer in order to control an exchange coupling force.

<Perpendicular Magnetic Recording Layer>

As the perpendicular magnetic recording layer, for example, a material is used which consists substantially of Co, contains at least Pt, Cr as needed, and further includes an oxide (for example, a silicon oxide, a titanium oxide). In the perpendicular magnetic recording layer, it is preferred for magnetic crystal particles to have a columnar structure. In the perpendicular magnetic recording layer having such a structure, the orientation and the crystallinity of the magnetic crystal particles are satisfactory, and as a result, a signal-to-noise ratio (SNR) suitable for high-density recording can be obtained. In order to obtain the structure described above, a quantity of oxide is important. A content of oxide is preferably 3 mol % or more and 12 mol % or less, and more preferably 5 mol % or more and 10 mol % of the total amount of Co, Pt, and Cr. When the content of oxide in the perpendicular magnetic recording layer is within the above-described range, the oxide is precipitated at the periphery of the magnetic particles, which can be isolated and become fine. When the content of oxide is over the above-described range, the oxide remains in the magnetic particles, which deteriorates the orientation and the crystallinity of the magnetic particles. Further, the oxide is precipitated above and under the magnetic particles, and as a result, preventing the formation of a columnar structure in which the magnetic particles penetrate through the perpendicular magnetic recording layer in the perpendicular direction. On the other hand, the content of oxide, which is less than the above-described range, causes the magnetic particles to be insufficiently isolated and become fine insufficiently. As a consequence, a noise at the time of reading/writing increases, and a signal-to-noise ratio (SNR) suitable for high-density recording cannot be obtained.

The content of Pt in the perpendicular magnetic recording layer is preferably 10 at % or more and 25 at % or less. When the content of Pt is within the above-described range, a uniaxial magnetic anisotropy constant Ku required for the perpendicular magnetic recording layer can be obtained, and moreover, the orientation and the crystallinity of the magnetic particles are made satisfactory. Consequently, it is possible to obtain a thermal fluctuation tolerance and a read/write property which are suitable for high-density recording. When the content of Pt is over the above-described range, a layer having a face-centered cubic (fcc) structure is formed in the magnetic particles, which could lead to deteriorations in the orientation and crystallinity. When the content of Pt is less than the above-described range, on the other hand, a thermal fluctuation tolerance cannot be obtained in accordance with a Ku suitable for high-density recording.

The content of Cr in the perpendicular magnetic recording layer is preferably 0 at % or more and 16 at % or less, and more preferably 10 at % or more and 14 at % or less. When the content of Cr is within the above-described range, high magnetisation can be maintained without decreasing a uniaxial magnetic anisotropy constant Ku. As a result, a read/write property which is suitable for high-density recording and a sufficient thermal fluctuation tolerance can be obtained. When the content of Cr is over the above-described range, a thermal fluctuation tolerance deteriorates because a Ku of the magnetic particles is made little, and the crystallinity and the orientation of the magnetic particles deteriorates. As a result, a read/write property deteriorates.

The perpendicular magnetic recording layer may include one or more additive elements selected from B, Ta, Mo, Cu, Nd, W, Nb, Sm, Tb, Ru and Re, in addition to Co, Pt, Cr and an oxide. Since these additive elements are contained, it is possible to stimulate a reduction in the size of the magnetic particles, or to improve the crystallinity and the orientation thereof, thereby enabling to obtain a read/write property and a thermal fluctuation tolerance which are more suitable for high-density recording. The total content of these addictive elements is preferably 8 at % or less. When it is over 8 at %, a phase except for a hexagonal close-packed (hcp) phase is formed in the magnetic particles, and thus, the crystallinity and the orientation of the magnetic particles are disturbed. As a consequence, it becomes impossible a read/write property and a thermal fluctuation tolerance which are suitable for high-density recording.

Examples of a material of the perpendicular magnetic recording layer further include a CoPt-based alloy, a CoCr-based alloy, a CoPtCr-based alloy, CoPtO, CoPtCrO, CoPtSi, and CoPtCrSi. The perpendicular magnetic recording layer may be a multilayer film of Co layer and a layer which consists substantially of at least one type selected from the group consisting of Pt, Pd, Rh and Ru. Further, a multilayer film such as CoCr/PtCr, CoB/PdB, or CoO/RhO having Cr, B or O added may be used as the each layers of the multilayer thereof.

As described in above examples, a magnetic recording layer having granular layer and continuous layer which are stacked, a magnetic recording layer having AFC structure and a magnetic recording layer having ECC structure can be used.

The thickness of the perpendicular magnetic recording layer is preferably 5 to 60 nm, and more preferably 5 to 30 nm. A perpendicular magnetic recording layer having a thickness within this range is suitable for high-density recording. When the thickness of the perpendicular magnetic recording layer is less than 5 nm, there is a tendency that a regenerative output is too low, which is lower than a noise component higher. When the thickness of the perpendicular magnetic recording layer is over 40 nm, on the other hand, there is a tendency that a readout output is too high, which distorts a waveform. A coercivity of the perpendicular magnetic recording layer is preferably 237000 A/m (3000 Oe) or more. When a coercivity is less than 237000 A/m (3000 Oe), there is a tendency that a thermal fluctuation tolerance declines. A perpendicular gradation of the perpendicular magnetic recording layer is preferably 0.8 or more. When the perpendicular gradation is less than 0.8, there is a tendency that a thermal fluctuation tolerance declines.

<Protective Layer>

The protective layer prevents corrosion of the perpendicular magnetic recording layer as well as damage of the surface of the medium when the magnetic head touches a medium. Examples of a material of the protective layer include a material containing C, $SiO_2$, and $ZrO_2$. A thickness of the protective layer is preferably made to be 1 to 10 nm. When the thickness of the protective layer is made to be within the above-described range, spacing between the head and a medium can be made less, which suitable for high-density recording.

Carbon can be classified into $sp^2$-bonded carbon (graphite) and $sp^3$-bonded carbon (diamond). The $sp^3$-bonded carbon is superior in the durability and the corrosion resistance to that of graphite. However, because the $sp^3$-bonded carbon is crystalline, the smoothness on a surface thereof is inferior to that of graphite. Usually, carbon is formed to be a film by sputtering using a graphite target. In this method, amorphous carbon in which $sp^2$-bonded carbon and $sp^3$-bonded carbon are mixed is formed. Carbon in which a ratio of $sp^3$-bonded carbon is high is called diamond-like carbon (DLC). Since the DLC is excellent in the durability and the corrosion resistance, and is excellent in the smoothness on a surface thereof as well because of amorphous, it is utilized as a surface protective film for the magnetic recording media. With respect to film formation of DLC by a chemical vapor deposition (CVD) method, DLC more rich in $sp^3$-bonded carbon can be formed by satisfying the conditions because DLC is generated by exciting and decomposing a raw gas in plasma, and due to a chemical reaction thereof.

<Lubricant Layer>

Examples of a lubricant agent include per-fluoro-polyether, alcohol fluoride, and fluorinated carboxylic acid.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording media comprising:
a magnetic recording layer formed on a substrate, wherein recording tracks and servo areas are prescribed as patterns of protrusions and recesses formed on the magnetic recording layer so that thin film portions of the magnetic recording layer are formed under the recesses, a thickness of magnetic recording layer at the thin film portion is smaller than a thickness of magnetic recording layer at the protrusion in the servo area, and a magnetization direction of the protrusion is antiparallel to a magnetization direction of the thin film portion in the servo area, and
wherein the magnetic recording layer comprises two or more magnetic layers which are stacked, and a part of the two or more magnetic layers is removed at the recesses in the servo area, and coercivity of the protrusion is different from coercivity of the thin film portion in the servo area.

2. The magnetic recording media according to claim 1, wherein the magnetic recording layer comprises a granular layer and a continuous layer which are stacked.

3. The magnetic recording media according to claim 2, wherein the granular layer is of a structure in which magnetic particles of CoCrPt alloy are dispersed in a matrix made of $SiO_2$.

4. The magnetic recording media according to claim 2, wherein the continuous layer is made of CoCrPt alloy.

5. The magnetic recording media according to claim 1, wherein the magnetic recording layer comprises a ferromagnetic layer, a nonmagnetic metal layer, and a granular layer which are stacked.

6. The magnetic recording media according to claim 5, wherein the ferromagnetic layer is a multilayer film that comprises Co films and Pd films, which are stacked alternately.

7. The magnetic recording media according to claim 5, wherein the nonmagnetic metal layer is a PdSi layer.

8. The magnetic recording media according to claim 5, wherein the granular layer is of a structure in which magnetic particles of CoCrPt alloy are dispersed in a matrix made of $SiO_2$.

9. A magnetic recording device comprising the magnetic recording media according to claim 1.

* * * * *